(12) United States Patent
Rand et al.

(10) Patent No.: US 10,713,184 B2
(45) Date of Patent: Jul. 14, 2020

(54) METHODS AND APPARATUS FOR MANAGEMENT OF DATA CONNECTIONS TO A PERIPHERAL DEVICE

(71) Applicant: Cirrus Logic International Semiconductor Ltd., Edinburgh (GB)

(72) Inventors: Robert David Rand, Peebles (GB); Bradley Allan Lambert, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/988,593

(22) Filed: May 24, 2018

(65) Prior Publication Data

US 2018/0349296 A1  Dec. 6, 2018

Related U.S. Application Data (60) Provisional application No. 62/512,920, filed on May 31, 2017.

(30) Foreign Application Priority Data

Jul. 19, 2017 (GB) .................................. 1711581.7

(51) Int. Cl.
    *G06F 13/38* (2006.01)
    *G06F 13/40* (2006.01)
    (Continued)

(52) U.S. Cl.
    CPC .......... *G06F 13/102* (2013.01); *G06F 1/3215* (2013.01); *G06F 1/3253* (2013.01);
    (Continued)

(58) Field of Classification Search
    CPC ........... G06F 13/38; G06F 13/40; G06F 13/42
    See application file for complete search history.

(56) References Cited

U.S. PATENT DOCUMENTS

2006/0230191 A1    10/2006  Chang et al.
2011/0031808 A1*   2/2011   Hwang ................. G06F 13/385
                                                              307/39
(Continued)

FOREIGN PATENT DOCUMENTS

EP       2738642 A1    6/2014

OTHER PUBLICATIONS

International Search Report and Written Opinion of the International Searching Authority, International Application No. PCT/GB2018/051426, dated Aug. 16, 2018.
(Continued)

*Primary Examiner* — David E Martinez
(74) *Attorney, Agent, or Firm* — Jackson Walker L.L.P.

(57) ABSTRACT

Interface circuitry is provided for a host device, the interface circuitry for controlling data connections between the host device and a peripheral device. The interface circuitry comprises: a discovery module, operable to detect mating of a connector of the peripheral device with a connector of the host device, and to store an indication of the current mating status of the connector of the host device; and a data connection management module, configured to: responsive to detection of mating between the connector of the peripheral device and the connector of the host device by the discovery module, establish a digital data connection between the connector of the peripheral device and the connector of the host device; responsive to detection of a deactivation event and based on the stored indication of the mating, deactivate the digital data connection; and responsive to detection of an activation event and based on the stored indication of the mating, re-establish the digital data connection between the connector of the peripheral device and the connector of the host device.

16 Claims, 5 Drawing Sheets

(51) Int. Cl.
*G06F 13/42* (2006.01)
*G06F 13/10* (2006.01)
*G06F 3/16* (2006.01)
*G06F 1/3234* (2019.01)
*G06F 1/3215* (2019.01)

(52) U.S. Cl.
CPC ............ *G06F 3/162* (2013.01); *G06F 13/385* (2013.01); *G06F 13/4282* (2013.01); *G06F 2213/0042* (2013.01)

(56) References Cited

U.S. PATENT DOCUMENTS

| | | | |
|---|---|---|---|
| 2012/0252541 A1* | 10/2012 | Thakur | H04M 1/6066 455/574 |
| 2013/0244491 A1 | 9/2013 | Sarwar et al. | |
| 2013/0326251 A1 | 12/2013 | Adewale et al. | |
| 2018/0349296 A1* | 12/2018 | Rand | G06F 13/102 |

OTHER PUBLICATIONS

Combined Search and Examination Report, UKIPO, Application No. GB1711581.7, dated Jan. 16, 2018.

* cited by examiner

METHODS AND APPARATUS FOR MANAGEMENT OF DATA CONNECTIONS TO A PERIPHERAL DEVICE

The field of representative embodiments of this disclosure related to methods, apparatuses, or implementations concerning or relating to connectors for data transfer between a host device and a peripheral device.

BACKGROUND

Many contemporary electronic devices have the capability to connect with external or peripheral audio devices. For instance, mobile telephones, tablets, laptop computers, mp3 players and the like are examples of electronic devices that are operable with peripheral audio devices such as a headset, for example, that is external to and distinct from the electronic device. A peripheral device such as a headset may typically comprise mono or stereo speakers for audio playback and possibly a microphone for voice communication.

Such external peripheral audio devices are often connected via a mating connector such as a plug and socket arrangement. For instance, many audio peripherals such as headsets have a jack plug such as a 3.5 mm jack plug for connection to a suitable jack socket on the host electronic device. A well-known arrangement for a jack plug and its associated socket is TRRS (Tip-Ring-Ring-Sleeve), which has four contacts for left audio, right audio, microphone, and ground. In one known arrangement, the tip (T) and first ring (R1) are used for left (L) and right (R) audio, for example left and right loudspeakers, with the second ring (R2) and sleeve (S) used for the microphone (M) and ground return (G) respectively. It will be appreciated that different arrangements for the left and right audio, microphone, and ground contacts are also possible. This provides for transfer of two channels of analogue audio data from the host device to the peripheral and transfer of a single channel of analogue audio data from the peripheral microphone to the host device. Other connectors allow for the transfer of digital data between the peripheral device and the host device. For example, USB connectors are well known and comprise a plurality of pins for the transfer of digital data. The Lightning® connector produced by Apple Inc. is another example. Such digital data connections require configuration, for example to identify the peripheral device and load appropriate drivers for that peripheral device, to assign an address to the peripheral device, and so forth. In the USB standard, such a process is known as enumeration.

In order to save power, a peripheral device may comprise a mechanism to enable it to be switched off, or placed in a low-power state. For example, in one arrangement, the peripheral device may comprise a power button which can be actuated by a user to switch the peripheral device off. In more complicated arrangements, the peripheral device may be switched off or powered down automatically, upon detection of an event such as a voice command or a period of inactivity. The peripheral device may draw power from the host device via the connection, and thus power is saved in the host device by deactivating the peripheral device when not in use.

A problem occurs when such a peripheral device is connected to a host device via a digital data connection (such as a USB connection), and is powered down or switched off without decoupling the connector of the peripheral device from the connector of the host device. Currently, designers are faced with two options upon the peripheral device being switched off: pull down the digital data connection between the host device and the peripheral, or maintain the digital data connection. The problem with pulling down the digital data connection is that the mechanism by which to detect power on of the peripheral device is similarly lost. The user can no longer use the power button on the peripheral, as the transfer of data indicating power on takes place via the digital data connection. Thus present devices utilize the second option, and maintain an active digital data connection between the host device and the peripheral device, even when the peripheral device is otherwise powered down. However, the active digital data connection consumes power in the order of tens of milliamps. Particularly in the field of mobile electronic devices, power consumption is an important consideration and should be reduced to the extent possible. Therefore the second option also has disadvantages.

SUMMARY

One aspect of the disclosure provides interface circuitry for a host device, the interface circuitry for controlling data connections between the host device and a peripheral device. The interface circuitry comprises: a discovery module, operable to detect mating of a connector of the peripheral device with a connector of the host device, and to store an indication of the current mating status of the connector of the host device; and a data connection management module. The data connection management module is configured to: responsive to detection of mating between the connector of the peripheral device and the connector of the host device by the discovery module, establish a digital data connection between the connector of the peripheral device and the connector of the host device; responsive to detection of a deactivation event and based on the stored indication of the mating, deactivate the digital data connection; and responsive to detection of an activation event and based on the stored indication of the mating, re-establish the digital data connection between the connector of the peripheral device and the connector of the host device.

In another aspect, the disclosure provides an electronic device comprising interface circuitry as recited above.

In a further aspect, the disclosure provides a system comprising: an electronic device as recited above, and a peripheral device.

Another aspect provides a method for operating data connections between a connector of a host device and a connector of a peripheral device. The method comprises: responsive to detection of mating between the connector of the peripheral device and the connector of the host device, storing an indication of the mating in the host device, and establishing a digital data connection between the connector of the peripheral device and the connector of the host device; responsive to detection of a deactivation event and based on the stored indication of the mating, deactivating the digital data connection; and responsive to detection of an activation event and based on the stored indication of the mating, re-establishing the digital data connection between the connector of the peripheral device and the connector of the host device.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present disclosure relate to methods and apparatus for managing data connections between a host device and a peripheral device. Some embodiments provide interface circuitry for the host device, which is configured to detect mating of a connector of the peripheral device with a connector of the host device (e.g. insertion of a peripheral device plug in a host device socket), and to store an indication of the mating in the host device. Upon deactivation of the peripheral device without decoupling of the connectors, a digital data connection between the host device and the peripheral device is deactivated (i.e. torn down); however, the stored indication of the mating is maintained. Upon activation of the peripheral device, the stored indication is used in the reactivation of the digital data connection. The stored indication may allow quicker re-establishment of the digital data connection, as the host device does not need to carry out further discovery checks, etc.

In further embodiments of the disclosure, an analogue data connection may be established between the host device and the peripheral in addition to the digital data connection. The analogue data connection may be maintained even while the peripheral device is powered down. The host device may be configured to re-establish the digital data connection responsive to detection of an activation event (such as actuation of a power button on the peripheral device, etc) based on data transferred over the analogue data connection. As the analogue data connection requires much lower power than the digital data connection (in the order of microamps), considerable power savings are achieved by utilizing the analogue data connection instead of the digital data connection.

Recently a new, compact 24-pin connector USB Type-C has been proposed. The USB type-C connector is a reversible connector, i.e. it has two-fold rotational symmetry and is designed to be operable with a type-C plug mated with a type-C receptacle in either possible mating orientation. The type-C connector is designed to be suitable for data transfer according to the present USB 3.1 specification for high data rate transfer and the USB type-C connector is, for example, particularly suitable for passing digital data at high data rates for e.g. video data transmission.

As used in this disclosure the term "USB type-C" or just "type-C" shall be taken to refer to compatibility with the USB type-C specification, which at the time of writing is the "USB Type-C™ Cable and Connector Specification Revision 1.2, Mar. 25, 2016", available (at the time of writing) from the USB organisation website at: http://www.usb.org/developers/docs/, the contents of which are incorporated herein by reference thereto. The term type-C shall be taken to mean any connector which is compatible with the release 1.2 specification identified above or compatible with the specification as it may be modified in the future.

Some aspects of the disclosure relate particularly to rotationally symmetric connectors (i.e. connectors with a plurality of pins arranged in a rotationally symmetric pattern). Aspects of the disclosure are thus described below with respect to the USB type-C connector. However, those skilled in the art will appreciate that embodiments of the disclosure are generally applicable to any present or future connectors, whether those connectors are rotationally symmetric or not. The invention is thus not limited to USB type-C connectors unless otherwise explicitly stated in the claims appended hereto.

Figure 1:
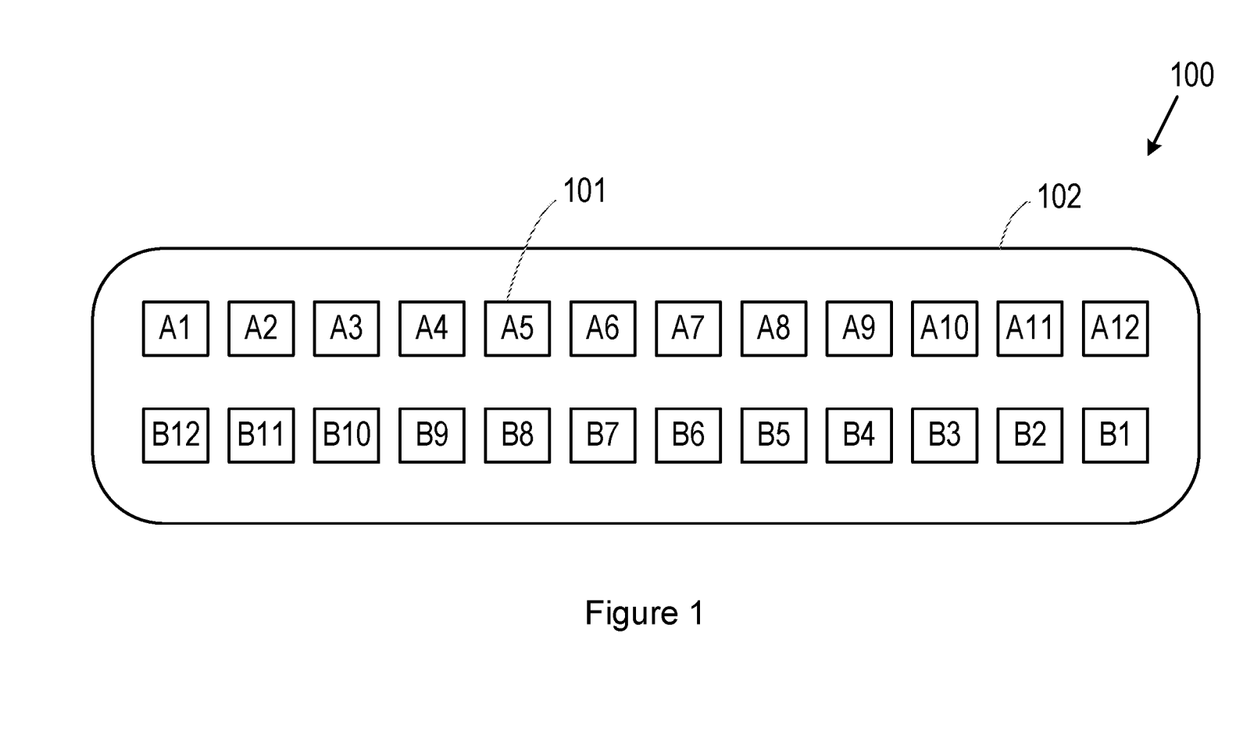
FIG. 1 illustrates the USB Type-C connector arrangement.

FIG. 1 illustrates the principles of a USB type-C connector 100. The connector has two rows of pins or contacts 101, with twelve pins in each row. Note that as used in this specification the term pin in relation to a connector shall mean an electrical terminal that may establish an electrical connection with a corresponding terminal of another connector when the connectors are correctly mated and the term contact shall mean the same. The pins are arranged so that the rows are rotationally symmetric (of order 2). By convention the pins in one row are identified as A1 to A12 and the pins of the other row are labelled B1 to B12. For ease of reference the pins are numbered so that a pin of a type-C receptacle, i.e. a socket or similar type of mating connector that may for instance be provided in a host device, has the same number as the pins of a type-C plug that might mate with that connector. The numbering of the pins of the receptacle may increase in a generally clockwise fashion as illustrated in FIG. 1, i.e. FIG. 1 illustrates the pin labelling for a view looking into the mouth of a type-C receptacle. For a type-C plug the numbering, as seen from a view looking into the plug, would instead increase in an anti-clockwise direction. Thus pin A3 say of a receptacle would mate with pin A3 of a corresponding plug or pin B3 if the plug was inserted in the rotated orientation.

The pins of type-C connector may be provided at least partly surrounded by a guide 102, which could for instance be the walls of a socket or, for a plug, some protective/guiding sheath, which may also be rotationally symmetric and may for instance have the form of a rounded rectangle.

As mentioned above the USB Type-C connector is designed to be suitable for fast digital data transfer, as well as power delivery, and can be seen as a general purpose or multi-purpose data connector. Whilst primarily envisaged for use for digital data transfer the USB Type-C specification describes that a stereo headset may be connected to a host device via a type-C receptacle of the host device by use of a separate adapter with a jack socket for a standard 3.5 mm TRRS audio jack plug and with a USB-type C plug. Annex A of the USB type C specification describes this (Audio Accessory Adapter Mode).

The USB type-C specification defines two characteristic impedances Rd and Ra (where Rd>Ra). As a downstream facing port, the USB system may effectively look for characteristic impedances Rd or Ra being connected to the CC pins and, if it is determined that a connection is present, the combination of impedances present at the CC pins may be used to determine the type of connection and the orientation. Thus for example an impedance Rd connected to one CC pin with the other being open defines that a UFP is attached and provides the orientation by virtue of which CC pin is connected to Rd. An impedance Rd at one pin and Ra at the other implies a powered cable with a UFP attached whereas an impedance of Ra at one pin with the other being open implies a powered cable without a UFP. If both pins A5 and B5 are connected to digital ground by an impedance less than a value Ra (wherein Ra equals 1.2 kohm) then the Audio Accessory Adapter Mode may be initiated.

Figure 2:
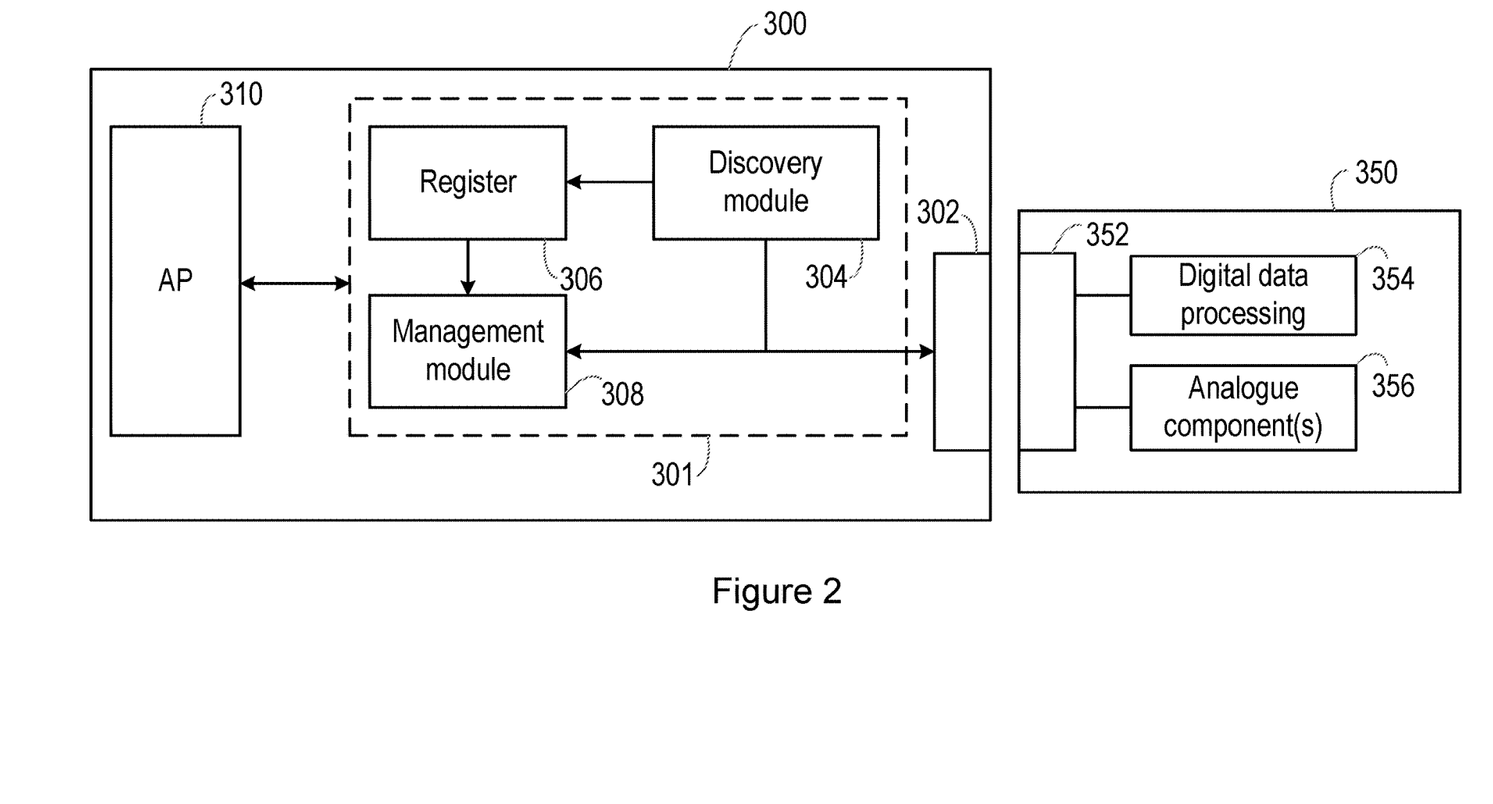
FIG. 2 shows a system comprising a peripheral device and a host device according to embodiments of the disclosure.

FIG. 2 shows a system according to embodiments of the disclosure, comprising a host device 300 and a peripheral device 350.

The host device 300 comprises a connector 302, providing an external interface for the transfer of data and/or electrical power to the peripheral device. As noted above, the connector may be any connector which is suitable for this purpose.

Interface circuitry 301 is provided, coupled to the connector 302, to manage the provision of data connections between the connector 302 of the host device and a corresponding connector of a peripheral device.

Processing circuitry 310 is also provided in the host device 300, coupled to the interface circuitry 301. The processing circuitry 310 may comprise any suitable processor or processor circuitry for running the host device 300 and the applications provided by it. For example, in one embodiment, the processing circuitry 310 may run an operating system and/or other applications provided by the host device 300. Such processor circuitry may be known as an applications processor (AP), and the processing circuitry 310 may also be termed the AP 310 herein.

The interface circuitry 301 comprises a discovery module 304, which is coupled to the connector 302, and operable to detect insertion (i.e., mating) and/or removal (i.e., separation, uncoupling) of a peripheral device connector with respect to the connector 302. For example, the discovery module may detect one or more characteristic impedances on one or more of the pins of the connector 302, and so detect the mating of the connector 302 with a connector of a peripheral device.

The discovery module 304 is operable to store an indication of the mating (or otherwise) of the connector 302 in a register 306 within the host device 300. For example, the indication may comprise a flag associated with the connector 302, which is set to one of a plurality of values, the plurality of values including at least a value indicating that the connector 302 is mated to a connector of a peripheral device, and a value indicating that the connector 302 is not mated to a connector of a peripheral device. In one embodiment, the flag may comprise a single bit, with just two possible values.

A management module 308 is also provided, coupled to the connector 302 and the register 306, and operable to manage one or more data connections between the host device 300 and the peripheral device 350. For example, as will be explained in greater detail below, the management module 308 may be operable to manage one or more of a digital data connection and an analogue data connection between the host device 300 and the peripheral device 350 over the connector 302. In particular, the management module may take into account the current indication stored in the register 306 when managing the data connections. The management module 308 may further take into account deactivation and activation events (which control deactivation and activation, respectively, of the peripheral device 350 or the data connections with the peripheral device 350). For example, the management module 308 may comprise or implement a finite state machine to control the data connections on the basis of the stored indication and the activation or deactivation events.

In the illustrated embodiment, the management module 308 is shown separately from the AP 310. However, in other embodiments, the management module 308 and/or the interface circuitry 301 as a whole may be implemented within the AP 310.

The peripheral device 350 comprises a connector 352, which corresponds to the connector 302 of the host device. For example, the connector 352 may take a shape which is complementary to the shape of the connector 302, such as in a plug and socket arrangement. The connector 352 may comprise a similar number of pins (i.e. connection points) as the connector 302, and implement a similar standard.

In one embodiment, the connectors 302, 352 are rotationally symmetric. That is, they each comprise a plurality of pins arranged in a shape which has n-fold rotational symmetry (where n is an integer greater than 1) about an axis which is substantially parallel to the direction of engagement (i.e. the direction in which the connectors are moved to bring them into engagement with each other). For example, USB-C connectors and Lightning® connectors each have two-fold rotational symmetry, and can be coupled together in two possible orientations. Other connectors, present or future, may have an arrangement of pins which has a greater number of possible orientations.

In such embodiments, the discovery module 304 may be further operable to determine a relative orientation of the connector 352 with respect to the connector 302. For example, the discovery module 304 infer an orientation by determining on which of two rotationally symmetric pins a characteristic impedance can be detected. The detected orientation may also be stored in the register 306.

The peripheral device 350 further comprises one or more digital components 354, which provide and/or receive digital data over the connection with the host device 300, and one or more analogue components, which provide and/or receive analogue data over the connection with the host device 300. For example, the digital components may comprise one or more digital signal processing units. The analogue components may comprise one or more of: a control device, operable to provide control signals to the host device 300; and a microphone, operable to receive voice input from a user of the peripheral device 350 and to provide corresponding voice data to the host device 300. Further examples will be discussed below.

Figure 3:
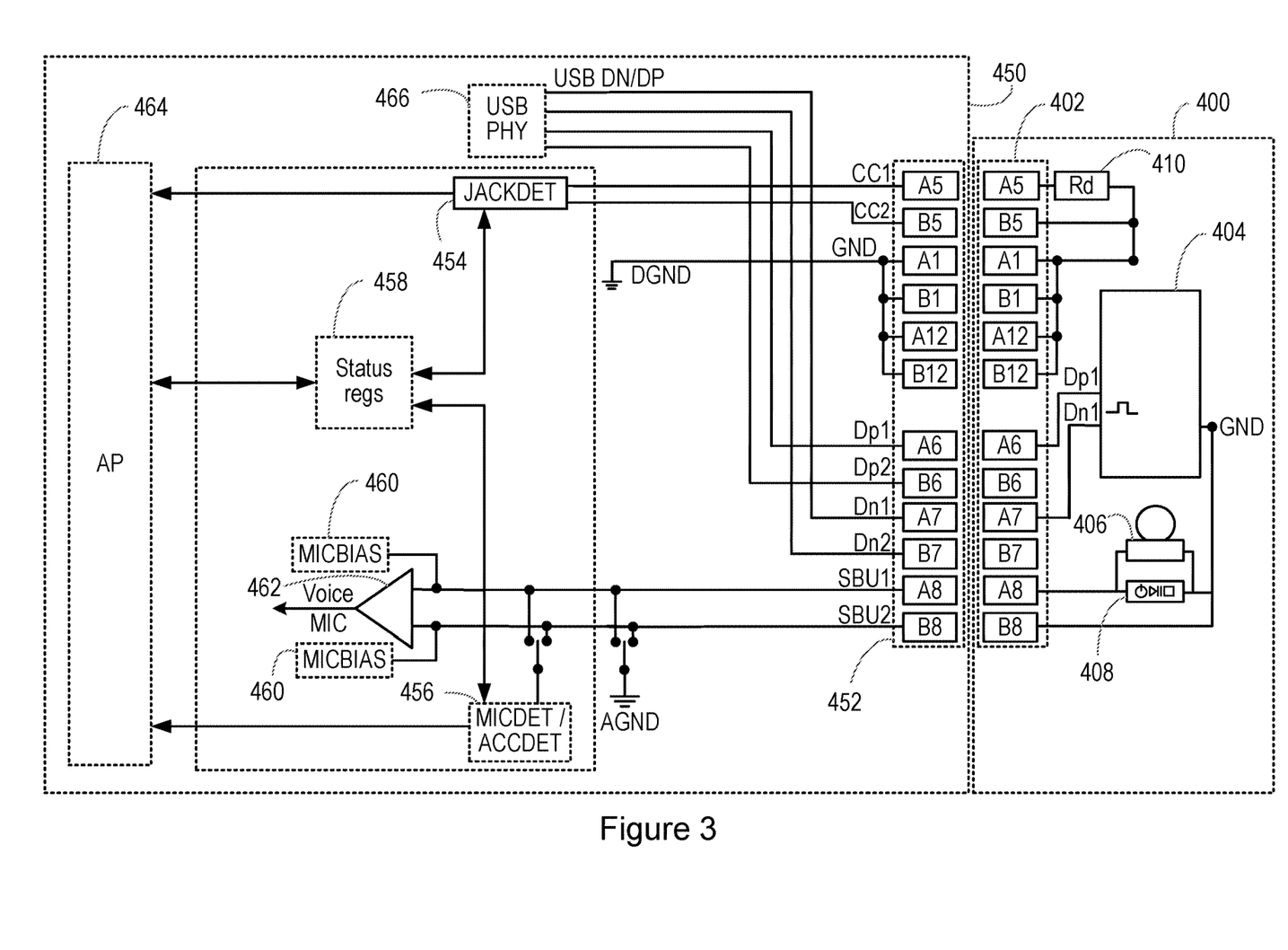
FIG. 3 illustrates in more detail a peripheral device and host device with connector arrangements according to embodiments of the disclosure.

FIG. 3 shows a peripheral device 400 and a host device 450, and their respective connections, according to embodiments of the disclosure.

In this embodiment, the peripheral device 400 comprises a connector 402, processing circuitry 404, a microphone 406, and a control device 408.

The peripheral device 400 also comprises at least one characteristic impedance 410, which in the illustrated embodiment is substantially equal to Rd, coupled to a CC pin of the connector 402. During a USB enumeration process, the peripheral device 400 will thus be identified as comprising an upward facing port (UFP). Note that in some embodiments a second characteristic impedance may be provided on the other CC pin, thus identifying the peripheral device 400 as a powered cable with an UFP.

The processing circuitry 404 is coupled to pins A6 and A7 of the connector 402, i.e. pins which are closest to the central axis of rotational symmetry of the connector 402, and also to an SBU pin B8, which carries a ground return. Pins A6 and A7 carry digital signals Dp1 and Dn1 respectively (i.e.

positive and negative components of a digital data connection). Although not illustrated, a second digital data connection may be established to the processing circuitry 404 using pins B6 and B7.

The microphone 406 is coupled to SBU pins A8 and B8, and is coupled in parallel with the control device 408 (which is also coupled to SBU pins A8 and B8). The microphone 406 may be suitable (i.e. positioned) for detecting the voice of a user of the peripheral device 400. The control device may comprise one or more buttons to control the peripheral device and/or the host device 450. For example, the control device 408 may comprise one or more buttons for controlling playback of audio signals provided by the host device 450 to the peripheral device 400 for output to the user. Alternatively, the control device 408 may comprise a power button, upon actuation of which the peripheral device 400 is switched off, powered down, or moved to a low-power state.

Although not illustrated, optionally one or more of the microphone 406 and the control device 408 may be monitored by the processing circuitry 404.

The host device 450 comprises a connector 452 which has a shape and connections which are complementary to the shape and connections of the connector 402. A jack-detect module 454 is coupled to pins A5 and B5, and operable to detect the characteristic impedances 410 upon coupling of the connector 402 to the connector 452. The jack-detect module 454 may further determine the type of peripheral device connected to the connector 452, based on the detected values of the characteristic impedances 410. For example, in this instance, the jack-detect module 454 may determine that the peripheral device comprises one or more UFPs, responsive to the detection of characteristic impedances equal to Rd.

Upon detection of the coupling of connectors 452, 402, the jack-detect module 454 may write to one or more status registers 458 an indication that the connectors 452, 402 are coupled together. As noted above, this may comprise the setting of a flag to indicate that the connectors 452, 402 are coupled together. The jack-detect module 454 may also transmit a signal (such as an interrupt signal) to an applications processor (AP) 464 or other suitable processing circuitry, indicating the connection of the peripheral device 400 to the host device 450. Further description of this operation is provided below.

As noted above, in some embodiments the connectors 452, 402 are rotationally symmetric, such that the host device 450 may need to determine the relative orientation of the connectors 452, 402. The host device 450 may thus comprise a mic detect module 456 coupled to either of pins A8 and B8 via a switch. An analogue ground is also coupled to the pins A8 and B8, such In such an embodiment in use the mic detect module 456 may thus determine which of pins A8 or B8 appears connected directly to the common ground return connection of the peripheral device 400 rather than appearing connected via the impedance of microphone 406 and control device 408, and thus determine the relative orientation of the connectors 452, 402.

Once established, the orientation may be recorded in the status registers 458, for example by setting a flag to indicate one of the multiple possible orientations of the connectors 452, 402. The mic detect module 456 may also transmit a signal to the AP 464 (or other path configuration module), to enable suitable signal paths to be established to the pins of the connector 452.

Mic bias modules 460 coupled to the A8 and B8 pins provide a biasing voltage for the microphone 406, while an amplifier 462 is similarly connected to the A8 and B8 pins so as to receive the voice output of the microphone.

Thus, on initial connection of the peripheral device 400 to the host device 450, the AP 464 receives an indication of the connection (and optionally the peripheral device type) from the jack detect module 454, and possibly an indication of the orientation of the connectors 452, 402 from the mic detect module 456. The AP 464 is thus able to configure appropriate signal paths to the various pins of the connector 452. For example, in one embodiment, the AP 464 may configure a digital connection module (such as a USB PHY module) 466 to establish a digital data connection (such as a digital USB connection) via one or more pins of the connector 452 (such as pins A6 and A7). An analogue data connection is also established via one or more pins of the connector 452. For example, the data transmitted via pins A8 and B8 (i.e. from the analogue microphone 406 and control device 408) may be in the analogue domain. As noted above, additionally or alternatively the data from the microphone 406 and the control device 408 may be fed to the host device 450 via the processing circuitry 404 and the digital data connection (while that connection is active).

Thus one or more data connections are established between the host device 450 and the peripheral device 400. At least one of the data connections is digital, and an analogue data connection may also be established.

According to embodiments of the disclosure, the host device 450 (and particularly the AP 464) monitors for detection of a deactivation event. The deactivation event may be any suitable event that mandates, requires, or instructs the digital data connection to be torn down or deactivated.

For example, in one embodiment, the deactivation event is detected based on data which is received from the peripheral device 400. For example, a user may actuate a power button on control device 408, instructing the peripheral device to power down or enter a low-power state. Similarly, a user may utter a control phrase via the microphone 406, which is interpreted by speech-recognition software in the host device 450 (e.g. running on the AP 464 or a dedicated module) as an instruction to power down the peripheral device, or tear down the digital data connection. Similarly, the user may instruct the peripheral device to power down, or the digital data connection to be torn down, via input to the host device.

Upon detection of the deactivation event, the digital data connection (e.g. the USB connection via pins A6 and A7) is torn down. However, as the connectors 452, 402 have not been decoupled (as determined by the jack detect module 454), the analogue connection via pins A8 and B8 remains. Further, the values in the status registers 458 remain unchanged, as the connectors 452, 402 remain coupled and in the same orientation as previously.

As the digital data connection draws significant power (in the order of 50 mA), even in the absence of any data transfer, its deactivation saves considerable power in the host device 450. The analogue data connection draws significantly less power (in the order of μA).

While the digital data connection is deactivated, the host device 450 continues to monitor for an activation event. The activation event may be any suitable event that mandates, requires, or instructs the digital data connection to activated or re-established.

The activation event may be generated within the host device 450 itself. For example, a user may enter an input to the host device 450, instructing power-on of the peripheral device, or re-establishment of the digital data connection.

In alternative embodiments, the activation event relates to data which is transferred via the (still active) analogue data connection. For example, a user may actuate a power button on control device 408, instructing the peripheral device to power up or switch on. Similarly, a user may utter a control word or phrase via the microphone 406, which is interpreted by speech-recognition software in the host device 450 (e.g. running on the AP 464 or a dedicated module) as an instruction to power on the peripheral device, or activate the digital data connection.

Upon detection of the activation event, and as the registers 458 indicate that the connectors 452, 402 are already connected, the digital data connection may be re-established. For example, the AP 464 may instruct the digital connection module 466 to establish a digital connection via the connector 452. Further, as the orientation of the connector is already known from the data contained in registers 458, the digital connection module 466 may be instructed to establish the connection using the appropriate pins (i.e. pins A6 and A7). The jack-detect and orientation detect processes in modules 454 and 456 need not be carried out as the connectors 452, 402 have never been decoupled from each other.

Figure 4:
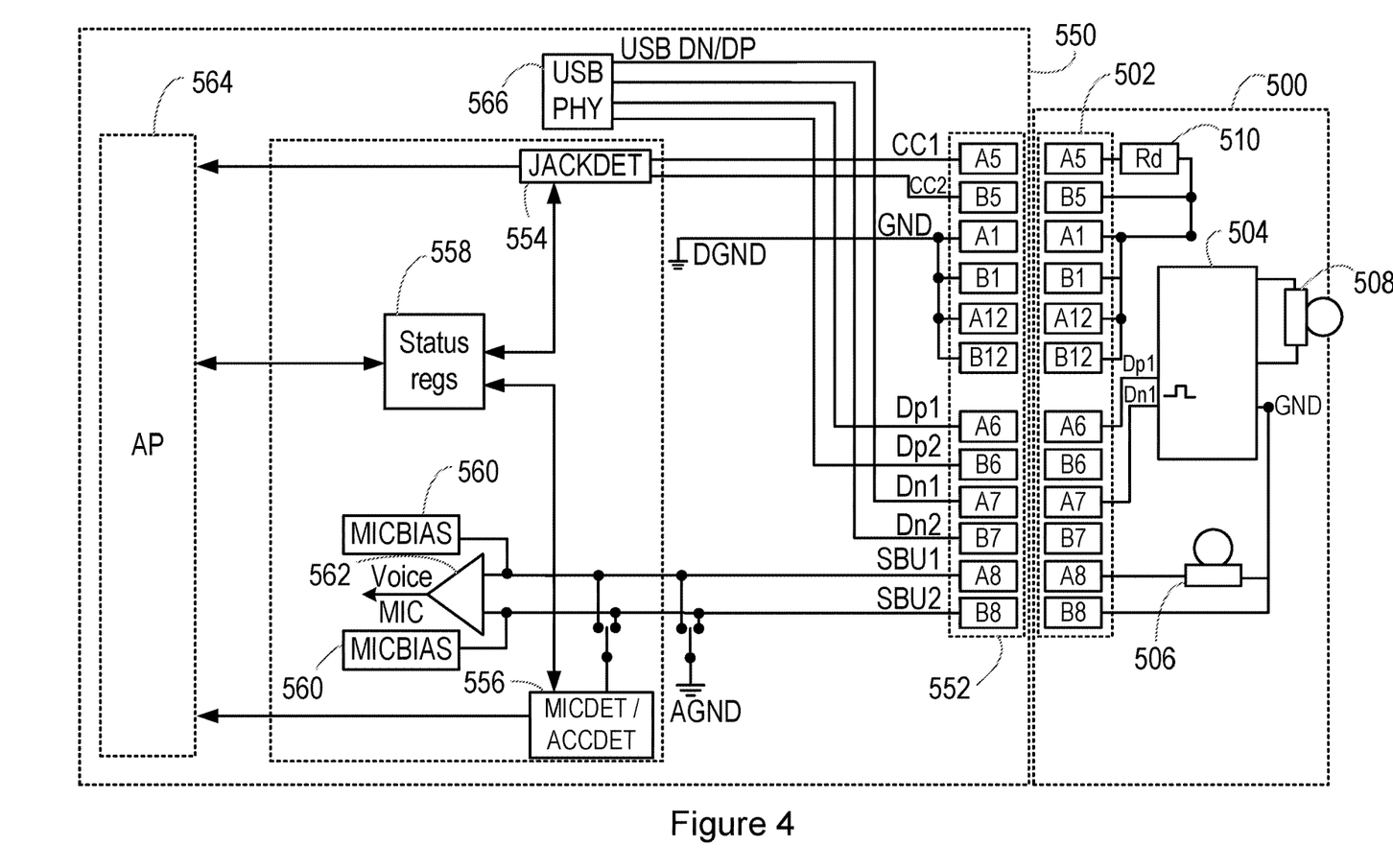
FIG. 4 shows in more detail a peripheral device and host device with connector arrangements according to further embodiments of the disclosure.

FIG. 4 shows an embodiment in which the peripheral device 500 comprises microphones 506, 508 (in practice any number of microphones may be provided), rather than a control device 408. Numerous features of the illustrated embodiment are common to the embodiment described above with respect to FIG. 3, and are not described in further detail herein.

One of the microphones (e.g. microphone 508) may be utilized as part of an active noise cancellation system, for example, and arranged to detect external noise for the cancellation of that noise from a voice signal, or an audio signal played to a user of the device 500. Alternatively or additionally, one or more of the microphones (e.g. microphone 508) may be responsive to ultrasound, e.g. for measuring the responses of the ear cavity for biometric purposes. One of the microphones (e.g. microphone 506) may be utilized to capture the voice input of a user of the device 500. Thus activation events associated with the peripheral device 500 may comprise voice activation.

Again, although not illustrated, optionally the microphone 506 may be monitored by the processing circuitry 404. In such an embodiment, the data from the microphone 506 may be fed to the host device 550 via the processing circuitry 504 and the digital data connection (while that connection is active).

The embodiments described above have concentrated on activation and deactivation events that are based on user input (e.g. via voice input, software control, or one or more physical buttons). However, in other embodiments, the activation and deactivation events may be based on automated processes. For example, the digital data connection may be torn down or deactivated, or the peripheral device powered down, responsive to a determination of a period of inactivity exceeding a time threshold. In such an embodiment, the host device 450 may detect a deactivation event when no digital data transfer (or data transfer below a threshold rate) takes place for a threshold period of time.

In further embodiments, the peripheral device may comprise one or more components, other than control devices and microphones, that enable detection of an activation or deactivation event. For example, the peripheral device may comprise one or more accelerometers that detect acceleration of the peripheral device, and generate corresponding acceleration data for the host device or the peripheral device.

The peripheral device may be powered down (and/or the digital data connection deactivated) upon detection by the peripheral device or the host device that the peripheral device has not moved for a threshold period of time. Alternatively or additionally, an activation event may be detected when movement of the peripheral device (or acceleration above a threshold value) is detected.

In further embodiments, the peripheral device may comprise so-called ear "buds", designed to be inserted in the ears of users during use. Such devices may comprise one or more components to detect when the buds are inserted in a user's ear. For example, optical sensors may detect a sudden transition to a dark environment (i.e. the ear canal); ultrasound input and output transducers may detect a small enclosed environment; a microphone may detect noise associated with a small enclosed environment; an accelerometer may detect the user's heartbeat. In each case, the sensor data can be utilized in the ear buds themselves (e.g. when active), or provided to the host device via the digital data connection (when active) or the analogue data connection (when the digital data connection is inactive). The detection of ear bud insertion by any one of these or other techniques may be utilized as an activation event prompting the digital data connection to be restored or activated. The detection of ear bud removal by any one of these or other techniques may be utilized as a deactivation event prompting the digital data connection to be torn down and/or the ear buds to be powered down.

Figure 5:
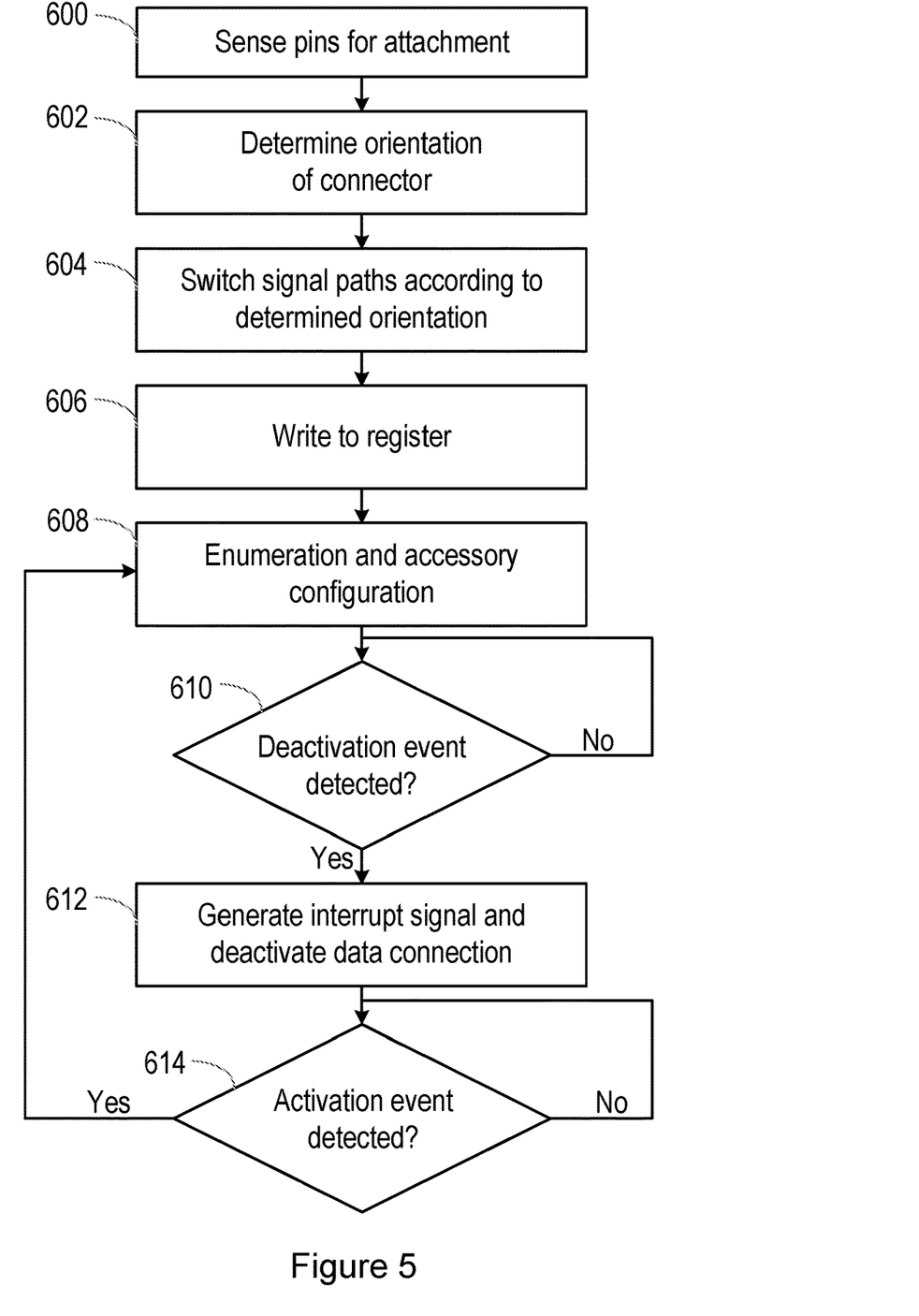
FIG. 5 is a flowchart of a method according to embodiments of the disclosure.

FIG. 5 illustrates a method of discovery and configuration that may be employed by the host device according to embodiments of the disclosure.

The method begins in step 600, in which a host device monitors one or more pins of its connector, to sense attachment of a connector associated with a peripheral device. For example, the attachment may be detected based on the detection of one or more characteristic impedances present within the peripheral device. The type of peripheral device connected may also be determined based on the characteristic impedance values. For example, it may be detected that the peripheral device comprises one or more UFPs, responsive to the detection of characteristic impedances equal to Rd.

in some embodiments the connectors associated with the host device and the peripheral device are rotationally symmetric, such that the relative orientation of the connectors may need to be determined. In step 602, therefore, the orientation of the connectors may be determined. For example, the host device may determine which of two rotationally symmetric pins (i.e. pins in rotationally symmetric positions with respect to each other) is connected to ground, and which is connected directly to a common ground return connection, and which is connected via the impedance of one or more components within the peripheral device.

In step 604, signal paths to and from the pins of the connector in the host device are established based on the determined orientation. The signal paths may be established by an AP or another suitable path configuration module. The signal paths may be established, for example, by switching the pin connections between different components in the host device, or by appropriately activating and deactivating components which are coupled to the same pin connections so as to establish signals paths to the correct components.

By this mechanism, an analogue data connection is established between the host device and the peripheral device via one or more pins of the connector.

In step 606, an indication that the connector of the host device is coupled to a connector of a peripheral device is written to a status register. This may comprise the setting of a flag to indicate that the connectors are coupled together. If determined, the orientation may also be recorded in the status registers, for example by setting a flag to indicate one of the multiple possible orientations of the connectors.

In step 608, a digital data connection is established between the host device and the peripheral device. For example, the establishment of the digital data connection may comprise an enumeration process, identifying the peripheral device type, allocating one or more digital addresses to the peripheral device, etc. The peripheral device may also be configured appropriately for the digital data connection in this step.

In step 610, the host device and/or the peripheral device monitors for a deactivation event that mandates, requires, or instructs the digital data connection to be torn down or deactivated. Various possible deactivation events are discussed above.

Upon detection of such a deactivation event, in step 612 an interrupt signal is generated and the digital data connection is torn down. However, as the connectors of the host device and the peripheral device have not been decoupled, the analogue connection remains. Further, the values in the status registers written in step 606 remain unchanged, as the connectors remain coupled and in the same orientation as previously.

While the digital data connection is deactivated, the host device continues to monitor for an activation event. The activation event may be any suitable event that mandates, requires, or instructs the digital data connection to activated or re-established, and various possible activation events are discussed above.

Upon detection of the activation event, and as the registers indicate that the connectors of the host device and the peripheral device are already connected, the digital data connection may be re-established and the process moves back to step 608. As the physical connection and its orientation are already known from the data contained in registers, the digital data connection may be established without steps 600, 602, 604 or 606.

Embodiments of the present disclosure thus provide methods and apparatus for connecting a peripheral device to a host device via a general or multi-purpose connector such as a USB Type-C connector. Embodiments allow a digital data connection between the host device and the peripheral device to be deactivated or torn down, and then re-established without the connectors of the host device and the peripheral device becoming decoupled.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors. For example the microphone bias and microphone detect blocks referred to above may share components.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like. Especially in more complex devices, there may be more than one USB Type-C or similar connector and associated signal paths and control per aspects of the invention.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. Interface circuitry for a host device, the interface circuitry for controlling data connections between the host device and a peripheral device, the interface circuitry comprising:
   a discovery module, operable to detect mating of a connector of the peripheral device with a connector of the host device, and to store an indication of the current mating status of the connector of the host device; and
   a data connection management module, configured to:
     responsive to detection of mating between the connector of the peripheral device and the connector of the host device by the discovery module, establish a digital data connection and an analogue data connection between the connector of the peripheral device and the connector of the host device;
     responsive to detection of a deactivation event and based on the stored indication of the mating, deactivate the digital data connection, wherein the analogue data connection remains active, responsive to detection of the deactivation event; and
     responsive to detection of an activation event and based on the stored indication of the mating, re-establish the digital data connection between the connector of the peripheral device and the connector of the host device.

2. The interface circuitry according to claim 1, wherein the activation event is detected based on data which is transferred between the host device and the peripheral device via the analogue data connection.

3. The interface circuitry according to claim 1, wherein the activation event comprises actuation of a power button on the peripheral device.

4. The interface circuitry according to claim 3, wherein the actuation of the power button is detected via the analogue data connection.

5. The interface circuitry according to claim 1, wherein the activation event comprises a voice command from a user of the peripheral device.

6. The interface circuitry according to claim 5, wherein voice data corresponding to the voice command is received via the analogue data connection.

7. The interface circuitry according to claim 1, wherein the peripheral device comprises one or more ear buds, and wherein the activation event comprises insertion of one or more of the ear buds into the ear canal of a user.

8. The interface circuitry according to claim 1, wherein the activation event comprises acceleration of the peripheral device which is greater than a threshold.

9. The interface circuitry according to claim 1, wherein the deactivation event comprises one or more of: a power down control signal generated within the host device; inactivity of the digital data connection; a voice command from a user of the peripheral device or the host device; actuation of a power button on the peripheral device.

10. The interface circuitry according to claim 1, wherein the discovery module is operable to detect mating of the connector of the peripheral device with the connector of the host device by detection of one or more characteristic impedances coupled to one or more predetermined contacts of the connector of the host device.

11. The interface circuitry according to claim 1, wherein the digital data connection comprises a digital USB data connection.

12. An electronic device comprising:
interface circuitry as claimed in claim 1.

13. A system comprising:
an electronic device according to claim 12; and
a peripheral device.

14. The system according to claim 13, wherein the peripheral device comprises one or more audio transducers for the output and/or input of audio signals.

15. A method for operating data connections between a connector of a host device and a connector of a peripheral device, the method comprising:
responsive to detection of mating between the connector of the peripheral device and the connector of the host device, storing an indication of the mating in the host device, and establishing a digital data connection and an analogue data connection between the connector of the peripheral device and the connector of the host device;
responsive to detection of a deactivation event and based on the stored indication of the mating, deactivating the digital data connection, wherein the analogue data connection remains active, responsive to detection of the deactivation event; and
responsive to detection of an activation event and based on the stored indication of the mating, re-establishing the digital data connection between the connector of the peripheral device and the connector of the host device.

16. The method according to claim 15, wherein the deactivation event relates to data which is transferred between the host device and the peripheral device via the analogue data connection.

* * * * *